(12) United States Patent
Gerdin

(10) Patent No.: US 9,654,153 B2
(45) Date of Patent: May 16, 2017

(54) MICROWAVE RADIO TRANSMITTERS AND RELATED SYSTEMS AND METHODS

(71) Applicant: TELEFONAKTIEBOLAGET L M ERICSSON (PUBL), Stockholm (SE)

(72) Inventor: Markus Gerdin, Nödinge (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/786,413

(22) PCT Filed: Jan. 29, 2015

(86) PCT No.: PCT/EP2015/051806
§ 371 (c)(1),
(2) Date: Oct. 22, 2015

(87) PCT Pub. No.: WO2016/119853
PCT Pub. Date: Aug. 4, 2016

(65) Prior Publication Data
US 2016/0359507 A1    Dec. 8, 2016

(51) Int. Cl.
*H04B 1/04*   (2006.01)
*H01Q 3/26*   (2006.01)
(Continued)

(52) U.S. Cl.
CPC .......... *H04B 1/0475* (2013.01); *H01Q 3/267* (2013.01); *H04B 1/0483* (2013.01);
(Continued)

(58) Field of Classification Search
CPC .. H04B 1/0475; H04B 1/0483; H04B 7/0452; H04B 7/0617; H01Q 3/267
See application file for complete search history.

(56) References Cited

U.S. PATENT DOCUMENTS 8,208,963 B2 * 6/2012 Codreanu ............. H04B 17/21
342/147
2007/0253476 A1 * 11/2007 Tirkkonen ............... H04L 1/06
375/230

(Continued)

FOREIGN PATENT DOCUMENTS

EP    1 178 562 A1    2/2002
WO   WO 2010/060953 A1    6/2010

*Primary Examiner* — Freshteh N Aghdam

(57) ABSTRACT

This disclosure provides a microwave radio transmitter apparatus comprising an antenna arrangement and a precoder module connected to the antenna arrangement. The precoder module comprises an estimation module. The precoder module is configured to receive a number N of signals $s_1, \ldots, s_N$ and to generate N phase-adjusted transmit signals $TX_1, \ldots, TX_N$. The antenna arrangement comprises N antenna elements $a_i$, $i=1, 2, \ldots, N$. Each antenna element $a_i$ is configured to obtain a respective phase-adjusted transmit signal $TX_i$ from the pre-coder and to transmit the respective phase-adjusted transmit signal $TX_i$. The precoder module is configured to obtain an observation receive signal RX, the observation receive signal comprising signals transmitted from the N antenna elements. The estimation module is configured to estimate for each antenna element $a_i$ a phase difference between the corresponding transmit signal $TX_i$ and the observation receive signal RX. The precoder module is configured to adjust each transmit signal based on the estimated phase difference.

17 Claims, 5 Drawing Sheets

(51) Int. Cl.
H04B 7/0452 (2017.01)
H04B 7/06 (2006.01)
H04B 17/10 (2015.01)
H04W 52/42 (2009.01)

(52) U.S. Cl.
CPC ......... H04B 7/0452 (2013.01); H04B 7/0617 (2013.01); H04B 17/10 (2015.01); H04W 52/42 (2013.01)

(56) References Cited

U.S. PATENT DOCUMENTS

| | | |
|---|---|---|
| 2009/0315774 A1 | 12/2009 | Son et al. |
| 2012/0230444 A1 | 9/2012 | Ravid et al. |
| 2012/0275356 A1* | 11/2012 | Aharony .............. H04B 7/0689 370/310 |
| 2014/0153461 A1* | 6/2014 | Lorenz .............. H04W 52/0245 370/311 |
| 2014/0286463 A1* | 9/2014 | Reingold ............. H04B 7/0456 375/347 |

* cited by examiner

MICROWAVE RADIO TRANSMITTERS AND RELATED SYSTEMS AND METHODS

TECHNICAL FIELD

The present disclosure relates to radio transmitters and radio systems and in particular to phase noise in signals transmitted by a microwave radio transmitter.

BACKGROUND

For radio communication at microwave frequencies, phase noise is a limiting factor. Phase noise creates even more severe issues in a multiple antenna setting (e.g. in MIMO, Multiple Input Multiple Output system). In a multiple antenna setting, several transmit antennas, each with a different oscillator, are used to transmit signals to several receive antennas operating at the same frequency. As each oscillator introduces a phase noise different from other oscillators at the transmit side, the signals transmitted exhibit a mutual phase difference. There is thus a problem of lack of phase alignment between transmitted signals. One possible solution to this problem is to estimate and compensate for the phase difference at the receiver. However, a wireless communication channel between the transmitter and the receiver introduces various types of impairments which may create issues for compensating at the receiver.

Another solution is to compensate for phase noise at the transmitter using information that is fed back from the receiver to the transmitter. However, such solution suffers from low performance due to the delay in receiving feedback information from the receiver and from overhead due to resources consumed by the feedback information transmitted from the receiver.

Thus, there is a need for a phase adjustment technique addressing at least partly the problems stated above without degrading performance.

SUMMARY

An object of the present disclosure is to provide a microwave radio transmitter apparatus, a network node, a radio system and a method which seeks to mitigate, alleviate, or eliminate one or more of the above-identified deficiencies in the art and disadvantages singly or in any combination.

This object is obtained by a microwave radio transmitter apparatus comprising an antenna arrangement and a pre-coder module connected to the antenna arrangement. The precoder module comprises an estimation module. The precoder module is configured to receive a number N of signals $s_1, \ldots, s_N$ and to generate N phase-adjusted transmit signals $TX_1, \ldots, TX_N$. The antenna arrangement comprises N antenna elements $a_i$, i=1, 2, ..., N. Each antenna element $a_i$ is configured to obtain a respective phase-adjusted transmit signal $TX_i$ from the pre-coder and to transmit the respective phase-adjusted transmit signal $TX_i$. The precoder module is configured to obtain an observation receive signal RX, the observation receive signal comprising signals transmitted from the N antenna elements. The estimation module is configured to estimate for each antenna element $a_i$ a phase difference between the corresponding transmit signal TXi and the observation receive signal RX. The precoder module is configured to adjust each transmit signal based on the estimated phase difference.

Hereby, the present disclosure provides a phase alignment of transmit signals by estimating a mutual phase difference and adjusting each transmit signal accordingly. Thus the signals transmitted across antenna elements exhibit only a negligible or a zero phase difference between each other. Thus, by the present technique, a transmitter having a single oscillator associated with all antenna elements is emulated. Consequently, the benefits associated with such a single oscillator transmitter are obtained by a transmitter having a plurality of independent oscillators.

According to some aspects, the estimation module is further configured to estimate the phase difference by correlating the observation receive signal RX with each transmit signal TXi generated for each antenna element $a_i$. The present technique averages out noise and thereby provides an improved accuracy in determining phase difference.

According to some aspects, the estimation module is further configured to generate N−1 transmit signals having a zero amplitude and one transmit signal having a non-zero amplitude; and to determine the phase difference by comparing a phase of the transmit signal having the non-zero amplitude with the phase of the observation receive signal RX. This allows the phase difference of one transmit signal to be observed at a time without interference from other N−1 transmitted signals.

According to some other aspects, the precoder module comprises a feedback channel to obtain the observation receive signal RX. The feedback channel comprises a local feedback channel and/or a reverse feedback channel from a microwave radio receiver apparatus. The local feedback channel allows observing the transmitted signal with a reduced delay compared to the reverse feedback channel from a microwave radio receiver apparatus.

There is also disclosed herein a network node for microwave radio communications comprising a microwave radio transmitter apparatus according to some aspects of this disclosure.

This disclosure also relates to a radio system for microwave radio communications. The radio system comprises a microwave radio transmitter apparatus according to aspects of this disclosure. The radio system comprises one or more microwave radio receiver apparatuses. Each microwave radio receiver apparatus comprises at least one antenna element. The microwave radio transmitter apparatus is configured to transmit signals to the one or more microwave radio receiver apparatuses in a same frequency band.

The proposed technique performs the phase noise compensation at the microwave radio transmitter apparatus, which allows simplifying the hardware architecture of the microwave radio receiver apparatus. Furthermore, the present technique allows building a distributed or multi-user MIMO system. This enables also the exploitation of transmit beamforming at the transmitter.

The object is furthermore obtained by a method for compensating for phase noise. The method is performed in a microwave radio transmitter apparatus. The microwave radio transmitter apparatus comprises an antenna arrangement and a precoder module. The precoder module comprises an estimation module. The antenna arrangement comprises N antenna elements $a_i$, i=1, 2, ..., N, each antenna element $a_i$ being configured to transmit a respective phase-adjusted transmit signal $TX_i$. The method comprises obtaining an observation receive signal RX, the observation receive signal comprising signals $TX_i$ transmitted from the N antenna elements. The method comprises estimating, for each antenna element $a_i$, a phase difference between the corresponding transmit signal $TX_i$ and the observation receive signal RX. The method comprises adjusting each transmit signal based on the estimated phase difference. The method 300 comprises transmitting each phase-adjusted transmit signal.

According to some aspects, the estimating comprises correlating the observation receive signal RX with each transmit signals $TX_i$ generated for each antenna element $a_i$.

According to some aspects, the estimating comprises: generating N-1 transmit signals having a zero amplitude and one transmit signal having a non-zero amplitude; and determining the phase difference by comparing a phase of the transmit signal having the non-zero amplitude with the phase of the observation receive signal RX.

In addition to the above method, there is also provided herein computer programs comprising computer program code which, when executed in a microwave radio transmitter apparatus, causes the microwave radio transmitter apparatus, to execute methods according to the present disclosure.

The computer programs, the methods, the network node and the radio system, provide advantages corresponding to the advantages already described in relation to the microwave radio transmitter apparatus.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
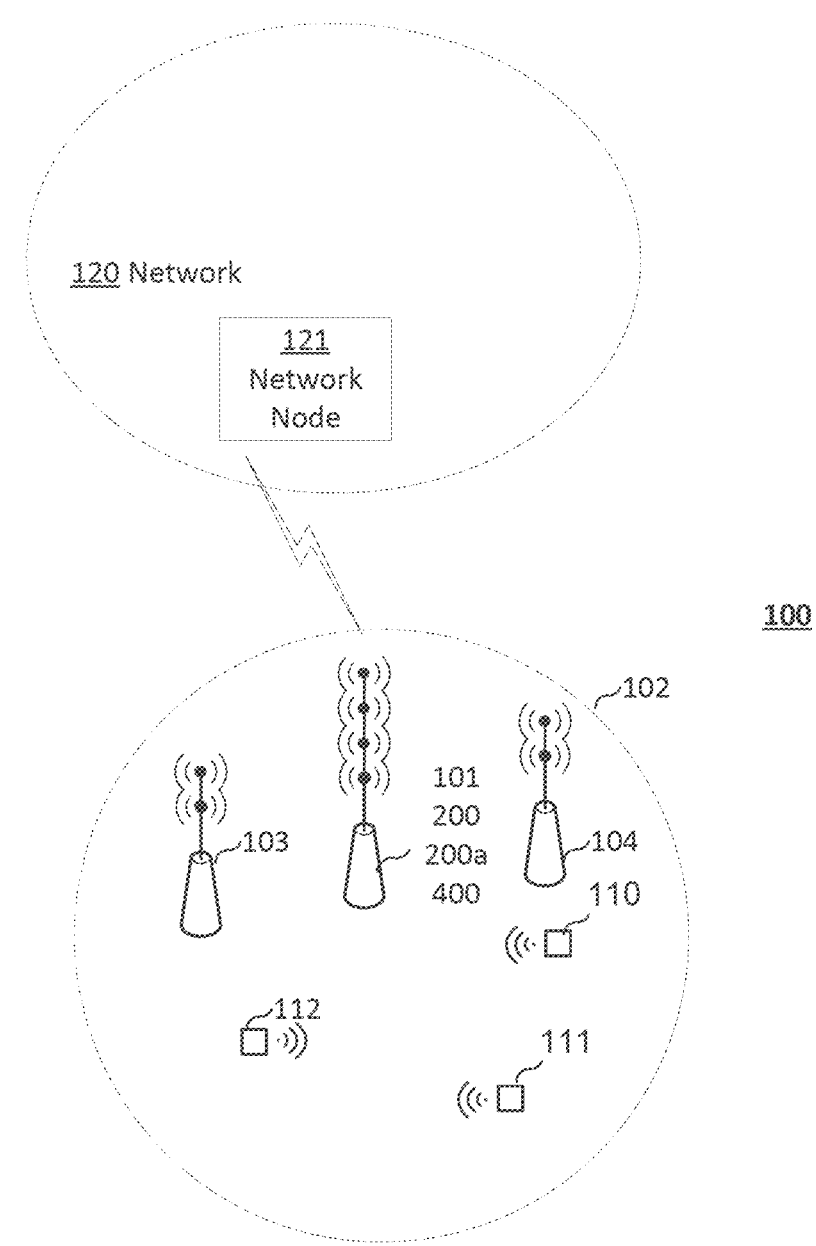
FIG. 1 is a block diagram illustrating a radio system according to some aspects of the present disclosure and a network node according to aspects of this disclosure.

The present teaching relates to mitigating phase difference affecting signals transmitted by antenna elements of an antenna arrangement of a microwave radio transmitter apparatus.

The present technique is applicable to any radio communication apparatus or system where transmit signals exhibit mutual phase difference.

The various apparatuses are according to different aspects implemented as, e.g., application-specific integrated circuit, ASIC, field-programmable logic array, FPGA, or general purpose processor.

As mentioned in the background section, phase noise is an issue in microwave radio communications and especially in a multiple antenna setting. In a multiple antenna setting, a radio transmitter comprises an antenna arrangement with a plurality of antenna elements. The antenna elements are used to transmit signals to e.g. several receive antennas operating at the same frequency. Each antenna element is associated with an oscillator. Each oscillator introduces a phase different from another oscillator at the transmit side. This results in the signals transmitted exhibiting a mutual phase difference. As each oscillator experiences phase noise, phases of the different oscillators are not constant, but vary randomly in time. There is thus a problem of lack of phase alignment between transmitted signals.

An account of techniques for mitigating phase misalignment of transmit signals will now be given, followed by an account of the proposed technique.

As phase difference between transmitted signals can only be perceived or detected after transmission, estimation and compensation for the phase difference can be performed either at the receiver or at the transmitter based on information given by the receiver. Techniques that estimate and compensate for the phase noise at the receiver are affected by the various types of impairments due to a wireless communication channel between the transmitter and the receiver. Such impairments (e.g. missing symbols in channel transfer matrix at the receiver) may render the compensating at the receiver difficult, if not impossible. Furthermore, compensation techniques at the receiver cannot be applied to scenarios where, for example in a MIMO setting, a central node transmits at the same frequency to two or more receivers which cannot communicate with each other. Techniques that compensate for phase noise at the transmitter using information that is fed back from the receiver to the transmitter suffer from low performance, due to the delay in receiving feedback information from the receiver and from overhead due to resources consumed by the feedback information from the receiver. Such techniques also cannot be applied to the micro cell setting discussed above as receivers cannot communicate between one another, and therefore cannot, or at least have difficulty to, determine any phase difference based on their received signal.

An additional approach is to measure the phase noise at the transmitter by mixing down the signal with the same oscillator that was used to mixing up. However such approach cannot capture and compensate for the phase difference between signals transmitted by different transmit antenna, each associated with a different oscillator. Another alternative can be to design a transmitter having a single oscillator associated with all antenna elements of the transmitter. However such alternative is very expensive as the link between the single oscillator and each antenna element has to be as lossless as possible and provided for ranges of several tens of meters.

Now an account of the current proposed technique for phase alignment will be given. As noted above, the existing techniques each present performance issues, complexity issues, or cost issues. It is therefore herein proposed to estimate at the transmitter, for each antenna element $a_i$, a phase difference between the corresponding transmit signal $TX_i$ and an observation receive signal RX. The observation receive signal RX can be obtained e.g. locally at the transmitter. It is then proposed to adjust at the transmitter each transmit signal based on the estimated phase difference. This results in a compensation of the phase misalignment exhibited in the transmitted signals. Thus the signals transmitted across antenna elements exhibit only a negligible or a zero phase difference. It is as if the transmitted signals are generated using a single oscillator without actually having the costly hardware solution of a single oscillator associated with all antenna elements. The proposed technique has thus the advantages of a transmitter having a single oscillator associated with all antenna elements, without actually having to implement a single oscillator transmitter. Hence, the proposed technique provides an increased performance improvement. The proposed technique performs the compensation at the transmitter, which, according to some aspects, allows to simplify the receiver hardware, and, according to some other aspects, allows to build a distributed or multi-user MIMO system comprising one transmitter having several antenna elements and a plurality of receivers having each at least one antenna element. Finally, the proposed technique enables or simplifies the exploitation of transmit beamforming at the transmitter.

Aspects of the present disclosure will be described more fully hereinafter with reference to the accompanying drawings. The microwave radio transmitter apparatus, the network node, the radio system, and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the present disclosure. As used herein, the singular forms "a", "an" and "the" are intended to include the plural forms as well, unless the context clearly indicates otherwise.

FIG. 1 shows a block diagram illustrating a radio system 100 according to some aspects of the present disclosure and a network node 121 according to this disclosure. This disclosure relates to a radio system 100 for microwave radio communications. The radio system 100 comprises a microwave radio transmitter apparatus 101, 200, 200a, 400 according to aspects of this disclosure that transmits in a coverage area 102. The radio system 100 comprises one or more microwave radio receiver apparatuses 103, 104. Each microwave radio receiver apparatus 103 comprises at least one antenna element. The microwave radio transmitter apparatus 101, 200, 200a, 400 is configured to transmit signals to the one or more microwave radio receiver apparatuses 103, 104 in a same frequency band. The radio system 100 or wireless communication system includes e.g. wireless devices 110, 111, and 112 in communication with a microwave radio transmitter and/or receiver apparatus comprised in e.g. a base station (or eNodeB).

According to some aspects, the one or more microwave radio receiver apparatuses 103, 104 form a distributed antenna arrangement. The radio system 100 forms e.g. a multi-user MIMO system or a distributed MIMO system. In such a MIMO system, the microwave radio transmitter apparatus 101, 200, 200a, 400 according to aspects of this disclosure comprises an antenna arrangement with N transmit antenna elements and the receive antenna elements are spread over a plurality of independent microwave radio receiver apparatuses 103, 104—each having at least one receive antenna element.

According to some aspects, the microwave radio transmitter apparatus 101, 200, 200a, 400 is configured to pre-code the transmit signals. The microwave radio receiver apparatus 103, 104 is configured to receive the transmitted signals and to process the received signals to recover data comprised in the transmit signals. For example, the microwave radio transmitter apparatus 101, 200, 200a, 400 generates the signals in phases that maximize the transmission in a desired direction and minimize the transmission in undesired directions. The microwave radio receiver apparatus 103, 104 is thus able to constructively combine the received signals. In other words, the microwave radio receiver apparatus 103, 104 combines the received signals so as to align phases between the received signals to receive wanted data streams and cancel out unwanted interference from other data streams.

This disclosure relates to a network node 121 for microwave radio communications comprising a microwave radio transmitter apparatus according to some aspects of this disclosure. The network node 121 may be a backhaul radio link equipment, a Radio Network Controller, RNC, or Base Station Subsystem, BSS. The network node 121 communicates via a network 120. An application scenario for the proposed technique comprises a MIMO cell setting where a central node, such as a radio link equipment or a network node 121, having a plurality of antenna elements transmits at the same frequency to a plurality of microwave radio receiver apparatuses.

Figure 2A:
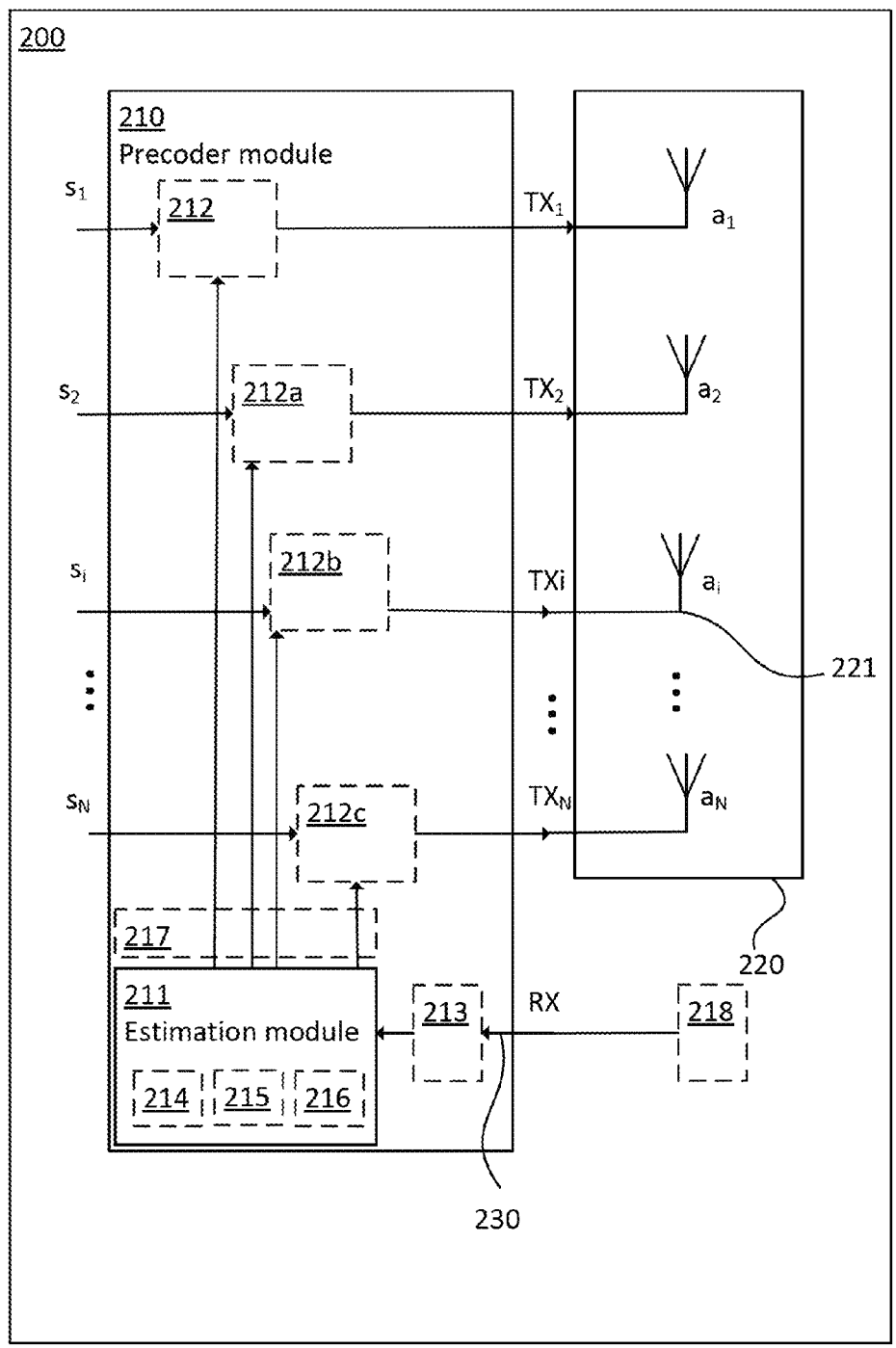
FIG. 2A is a block diagram illustrating a microwave radio transmitter according to some aspects of the present disclosure.

FIG. 2A shows a block diagram illustrating aspects of a microwave radio transmitter apparatus 200. The radio transmitter apparatus 200 operates in microwave frequencies, such as frequencies between 3 GHz and 140 GHz and in particular frequencies between about 7 GHz and 40 GHz. The microwave radio transmitter apparatus 200 performs compensation of phase noise, such as compensation for differential phase noise between transmitted signals. Phase noise is introduced in a transmit signal by e.g. an oscillator, and affects the transmit signal phase. Each oscillator introduces a phase noise different from other oscillators in the antenna arrangement, which creates differential phase noise. The differential phase noise refers herein to a randomly varying phase difference between a phase of a signal transmitted by a first antenna element and a phase of a signal transmitted by a second antenna element.

The microwave radio transmitter apparatus 200 comprises an antenna arrangement 220 and a precoder module 210 connected to the antenna arrangement 220. The precoder module comprises an estimation module 211. The precoder module 210 is configured to receive a number N of signals $s_1, \ldots, s_N$ and to generate N phase-adjusted transmit signals $TX_1, \ldots, TX_N$. Hence, the precoder module 210 comprises e.g. a phase-compensation module 212, 212a, 212b, 212c. The phase compensation module 212, 212a, 212b, 212c comprises a mixing module, such as a digital mixing module. The signals $s_1, \ldots, s_N$ are for example data flows to be precoded by the precoder module 210 and transmitted using the antenna arrangement 220. The signals $s_1, \ldots, s_N$ are precoded by the precoder module 210, such as in the baseband part of apparatus 200 (e.g. digital baseband part), to generate phase-adjusted transmit signals $TX_1, \ldots, TX_N$. The phase-adjusted transmit signals $TX_1, \ldots, TX_N$ are generated to compensate for mutual phase misalignment observed in the transmitted signals.

The antenna arrangement 220 comprises N antenna elements $a_i$ 221, i=1, 2, . . . , N. Each antenna element 221 $a_i$ is configured to obtain a respective phase-adjusted transmit signal $TX_i$ from the pre-coder and to transmit the respective phase-adjusted transmit signal $TX_i$.

The precoder module 210 is configured to obtain an observation receive signal RX, the observation receive signal comprising signals transmitted from the N antenna elements. Hence, the precoder module 210 comprises e.g. an obtain module 213. The precoder module 210 is for example configured to receive the observation receive signal RX from the antenna arrangement 220 or from a Transmit Observation Receiver 218, TOR, configured to sample the signals transmitted by the antenna elements $a_i$. The observation receive signal RX comprises e.g. an aggregation of the transmitted signals and/or a sequence of the transmitted signals.

The estimation module 211 is configured to estimate for each antenna element $a_i$ 221 a phase difference between the corresponding transmit signal $TX_i$ and the observation receive signal RX. By comparing each transmit signal $TX_i$ to the observation receive signal RX, it is possible to derive the mutual phase difference between each transmit signal $TX_i$ and the observation receive signal RX and to compensate for it. Stated differently, the estimation module 211 is configured to estimate a phase error of each transmit signal $TX_i$ with respect to the observation receive signal RX.

The precoder module 210 is configured to adjust each transmit signal based on the estimated phase difference. Hence, the phase-compensation module 212, 212a, 212b, 212c is configured to generate phase-adjusted transmit signals $TX_1, \ldots, TX_N$ by adjusting each signal $s_i$ based on the estimated phase difference. For example, the phase-compensation module 212, 212a, 212b, 212c adjusts a phase of the signal $s_i$ based on the estimated phase difference so as to align phases of all transmit signals fed to the antenna elements. In other words, the differential phase noise of the different transmitting antenna elements is compensated for.

According to some aspects, the estimation module 211 is further configured to estimate the phase difference by correlating the observation receive signal RX with each transmit signal $TX_i$ generated for each antenna element $a_i$. Hence, the estimation module 211 comprises e.g. a correlator module 214. For example, once the observation receive signal RX has been down converted, it is passed on to the precoder module 210 and to the estimation module 211 which then correlates each transmit signals and the observation receive signal RX, to obtain a phase difference between each transmit signal and the down converted observation receive signal RX.

In an illustrative example where the proposed technique is applied, the apparatus 200 or the precoder 210 obtains an observation receive signal RX (e.g. a sequence or an aggregation of signals transmitted by the antenna arrangement 220). The precoder 210 retrieves the corresponding transmit signal $TX_i$ (or e.g. sequence of signals $TX_i$ for each antenna element). The precoder 210 or the estimation module 211 verifies that the observation receive signal RX and the corresponding transmit signal $TX_i$ (or e.g. the two sequences) are time aligned by finding the time delay that maximizes the cross-correlation of the amplitudes of the observation transmit signal RX and corresponding transmit signal $TX_i$ (or e.g. of the two sequences). Then the precoder 210 or the estimation module 211 computes a complex cross-correlation of the amplitudes of the observation transmit signal RX and corresponding transmit signal $TX_i$ (or e.g. of the two sequences) and determines a phase of the complex cross-correlation at a delay corresponding to the delay between transmission and reception of the RX signal. According to some aspects, this delay corresponds to the location in time of the cross-correlation having maximum absolute value. The phase of the complex cross-correlation is the estimated phase difference between the observation transmit signal RX and corresponding transmit signal $TX_i$ (or e.g. between the two sequences).

According to some aspects, the estimation module 211 is further configured to generate N−1 transmit signals having a zero amplitude and one transmit signal having a non-zero amplitude; and to determine the phase difference by comparing a phase of the transmit signal having the non-zero amplitude with the phase of the observation receive signal RX. Hence, the estimation module 211 comprises e.g. a generator module 215 and a determinor module 216. For example, the transmit signals having a zero amplitude comprise special pilot symbols such as zeroes or embedded zeroes, i.e., pilot symbols having zero amplitude. Such pilot symbols are represented as a point in the center of, e.g., a quadrature amplitude modulated signal diagram. Note that the zero amplitude pilot symbols only have zero amplitude at an exact point in time, and non-zero amplitude otherwise. For example, the estimation module 211 generates N−1 transmit signals having a zero amplitude at regular time intervals, which the antenna arrangement 220 transmits on all transmit antenna elements except one, e.g. antenna element 221. The one transmit antenna element, e.g. 221, transmits a transmit signal having a non-zero amplitude. The transmitted signals are captured in the observation receive signal RX. Once observation receive signal RX obtained or received at the precoder module 210 or estimation module 211, the phase difference between the transmitted signal having a non-zero amplitude and the observation receive signal RX can be estimated as the phase error or misalignment for that transmit antenna element, e.g. 221, at said exact point in time.

According to some aspects, the precoder module 210 comprises a feedback channel 230 to obtain the observation receive signal RX. The feedback channel 230 comprises a local feedback channel and/or a reverse feedback channel from a microwave radio receiver apparatus 103, 104. The feedback channel 230 e.g. allows receiving the observation receive signal RX. The local feedback channel is e.g. connected to a Transmit Observation Receiver 218, TOR, configured to sample the signals transmitted by the antenna elements $a_i$ and to generate the observation receive signal RX. The local feedback channel allows observing the transmitted signal with a reduced delay compared to the reverse feedback channel from a microwave radio receiver apparatus.

According to some aspects, when the phase difference varies over time, the estimation module 211 is configured to estimate for each antenna element $a_i$ 221 a frequency offset between the corresponding transmit signal $TX_i$ and the observation receive signal RX. The estimation module 211 is configured to adjust each transmit signal based on the estimated frequency offset. To clarify, the phase difference can drift linearly over time, which appears as a frequency offset between antenna elements. This constant phase drift, or frequency offset, can be estimated and compensated for in the same way, and by the same hardware, as the phase difference is compensated.

According to some aspects, the N antenna elements are configured to transmit their respective transmit signals $TX_i$ at a same frequency. For example, the N antenna elements are configured to transmit their respective transmit signals $TX_i$ around the same frequency. For example, the microwave radio transmitter 220 having antenna elements transmitting at or around the same frequency comprises a central node, such as a radio link equipment, transmitting at the same frequency to two or more receivers which cannot process signals jointly in order to e.g. perform MIMO decoding.

According to some aspects, the estimation module 211 is configured to estimate a difference in output power between two or more antenna elements $a_i$ 221 based on the observation receive signal RX, and the precoder module 210 is configured to adjust output power of the antenna elements $a_i$ 221 based on the estimated difference. Hence the precoder module 210 comprises e.g. a power-adjusting module 217. Adjusting the output power of the antenna elements $a_i$ 221 based on the estimated difference provides e.g. an improved estimation of the phase difference.

Figure 2B:
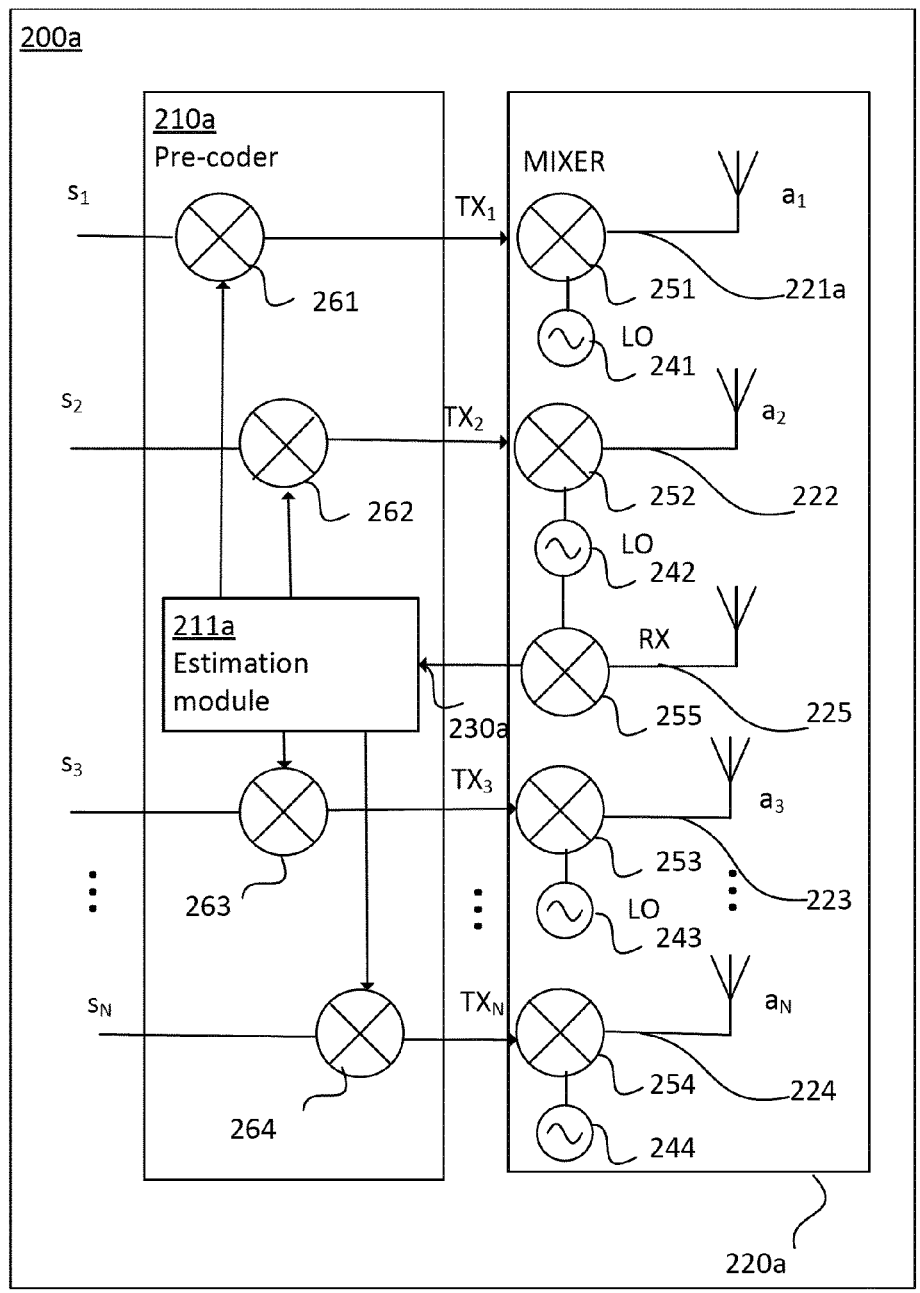
FIG. 2B is a block diagram illustrating a microwave radio transmitter according to some aspects of the present disclosure.

FIG. 2B shows a block diagram illustrating aspects of a microwave radio transmitter apparatus 200a. The microwave radio transmitter apparatus 200a comprises an antenna arrangement 220a and a precoder module 210a connected to the antenna arrangement 220a. The precoder module comprises an estimation module 211a. The precoder module 210a is configured to receive a number N of signals $s_1, \ldots, s_N$ and to generate N phase-adjusted transmit signals $TX_1, \ldots, TX_N$. Hence, the precoder module 210a comprises a phase-compensation module for each transmit path, such as a mixer module 261, 262, 263, 264. The antenna arrangement 220a comprises N antenna elements $a_i$ 221a, 222, 223, 224, i=1, 2, . . . , N. Optionally, the antenna arrangement 220a comprises a receive antenna element 225. Each antenna element 221a, 222, 223, 224 $a_i$ is configured to obtain a respective phase-adjusted transmit signal $TX_i$ from the pre-coder 210a and to transmit the respective phase-adjusted transmit signal $TX_i$. The antenna arrangement 220a comprises N oscillators, each oscillator 241, 242, 243, 244 being associated with one respective antenna elements $a_i$ 221a, 222, 223, 224. The antenna arrangement 220a comprises N mixer modules, such as mixer modules 251, 252, 253, 254 to up convert signals. Optionally, the antenna arrangement 220a comprises an additional mixer module 255 associated with antenna 255 and oscillator 242 for receiving and down-converting an observation receive signal RX. The N oscillators operate in the same frequency band but have random variation in phase (i.e. phase noise), leading to differences between each two oscillators phases (i.e. differential phase noise). The N oscillators are e.g. local oscillators, LO. This results in an unwanted phase difference between each two transmitted signals, since the phase of the oscillator determines the phase of the output radio frequency signal.

The precoder module 210a is configured to obtain an observation receive signal RX, the observation receive signal comprising signals transmitted from the N antenna elements. According to some aspects, the precoder module 210a comprises a feedback channel 230a to obtain the observation receive signal RX. According to some aspects, the feedback channel 230a is connected to the receive antenna 225 comprised in the antenna arrangement 220a. The receive antenna 225 is preferably configured to be omnidirectional, or directional to receive the transmitted signals. An omnidirectional antenna refers to an antenna which radiates uniformly in all directions in one plane. The receive antenna 225 is associated with one of the N oscillators, such as oscillator 242, and with a mixer module 255 so as to mix down the observation receive signal RX. The signal mixed down (or down converted) with the oscillator 242 allows deriving the phase difference between the signals transmitted using each oscillator and the RX signal, i.e. in this example between the phase of oscillator 241, 243, 244 and the phase of oscillator 242. Stated differently, the estimation module 211a derives a phase difference between the oscillator which is used for down converting, e.g. oscillator 242, and each one of the other oscillators used for up converting, e.g. oscillators 241, 242, 243. This permits to continually compensate at the precoder module 210a for phase difference using the information provided by the feedback channel. So the phase difference is "pre-compensated" for at the precoder module 210a. Only one transmitter phase (the one of the oscillator which is used for down converting) and no or negligible phase difference would appear to an observer or the receiver side, i.e. at the microwave radio receiver apparatus 103, 104.

The estimation module 211a is configured to estimate for each antenna element $a_i$ 221 a phase difference between the corresponding transmit signal $TX_i$ and the observation receive signal RX. The precoder module 210a is configured to adjust each transmit signal based on the estimated phase difference. The precoder module 210a comprises e.g. mixer modules 261, 262, 263, 264 acting as a phase-compensation module 212, 212a, 212b, 212c to generate phase-adjusted transmit signals $TX_1, \ldots, TX_N$ by adjusting each signal $s_i$ based on the estimated phase difference. The precoder module 210a compensates thus for differential phase noise estimated.

Figure 3:
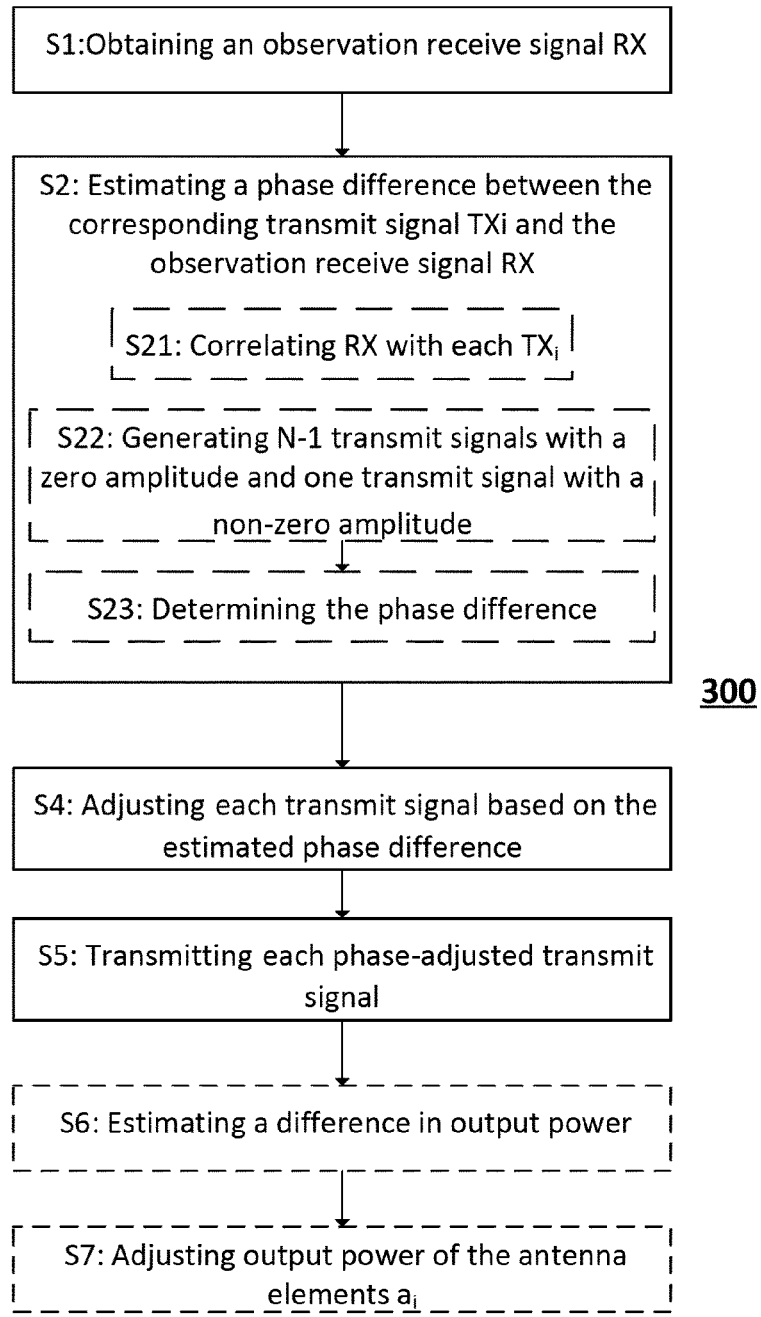
FIG. 3 is a flowchart illustrating methods according to some aspects of this disclosure.

FIG. 3 shows a flowchart illustrating methods 300 according to some aspects of this disclosure. The methods 300 for compensating for phase noise are performed in a microwave radio transmitter apparatus 200 described above. The microwave radio transmitter apparatus 200 comprises an antenna arrangement 220 and a precoder module 210. The precoder module 210 comprises an estimation module 211. The antenna arrangement 220 comprises N antenna elements $a_i$ 221, i=1, 2, . . . , N, each antenna element $a_i$ 221 being configured to transmit a respective phase-adjusted transmit signal $TX_i$. The method 300 comprises obtaining S1 an observation receive signal RX, the observation receive signal comprising signals $TX_i$ transmitted from the N antenna elements. Obtaining S1 is e.g. performed using a feedback channel. Obtaining S1 comprises e.g. obtaining a down converted RX signal. Obtaining S1 comprises receiving the observation receive signal RX, such as receiving the observation receive signal RX via a feedback channel 230. The feedback channel comprises a local feedback channel and/or a reverse feedback channel from a microwave radio receiver apparatus. The local feedback channel comprises e.g. a TOR module.

The method 300 comprises estimating S2, for each antenna element $a_i$, a phase difference between the corresponding transmit signal $TX_i$ and the observation receive signal RX.

The method 300 comprises adjusting S4 each transmit signal based on the estimated phase difference. Adjusting S4 comprises e.g. adjusting a phase of the transmit signal based on the estimated phase difference so as to align phases of all transmit signals fed to the antenna elements. In other words, adjusting S4 comprises e.g. compensating for the differential phase noise experienced by the different transmitting antenna elements. For example, adjusting S4 results in a phase alignment of all transmit signals fed to the antenna elements. The method 300 comprises transmitting S5 each phase-adjusted transmit signal. For example, the method 300 comprises transmitting S5 each phase-adjusted transmit signal using the antenna arrangement 220, where each antenna element transmits a phase-adjusted transmit signal. This results in transmitting signals aligned in phase. An observer or a receiver of the transmitted signals would experience that the signals are aligned in phase as if the signals were generated using a single oscillator. This reduces the complexity of the transmitter that benefits from advantage of a single oscillator without having actually to adopt a single oscillator hardware architecture. Furthermore, the receiver does not need to perform any compensation for differential phase noise, and therefore no additional hardware is needed at the receiver for phase noise compensation purposes. According to some aspects, the step S2 of estimating comprises correlating S21 the observation receive signal RX with each transmit signals $TX_i$ generated for each antenna element $a_i$. For example, the estimation module 211 correlates each transmit signals and the observation receive signal RX, to obtain a phase difference between each transmit signal and the observation receive signal RX.

According to some aspects, the step S2 of estimating comprises generating S22 N−1 transmit signals having a zero amplitude and one transmit signal having a non-zero amplitude; and determining S23 the phase difference by comparing a phase of the transmit signal having the non-zero amplitude with the phase of the observation receive signal RX. For example, the transmit signals having a zero amplitude comprise special pilot symbols such as zeroes or embedded zeroes.

According to some aspects, the method 300 further comprises estimating S6 a difference in output power between two or more antenna elements $a_i$ 221 based on the observation receive signal RX, and adjusting S7 output power of the antenna elements $a_i$ 221 based on the estimated difference. Adjusting S7 improves e.g. the estimation of the phase difference.

This disclosure relates to a computer program comprising computer program code which, when executed in an microwave radio transmitter apparatus 200, causes the microwave radio transmitter apparatus 200 to execute any of the steps of method 300.

Figure 4:
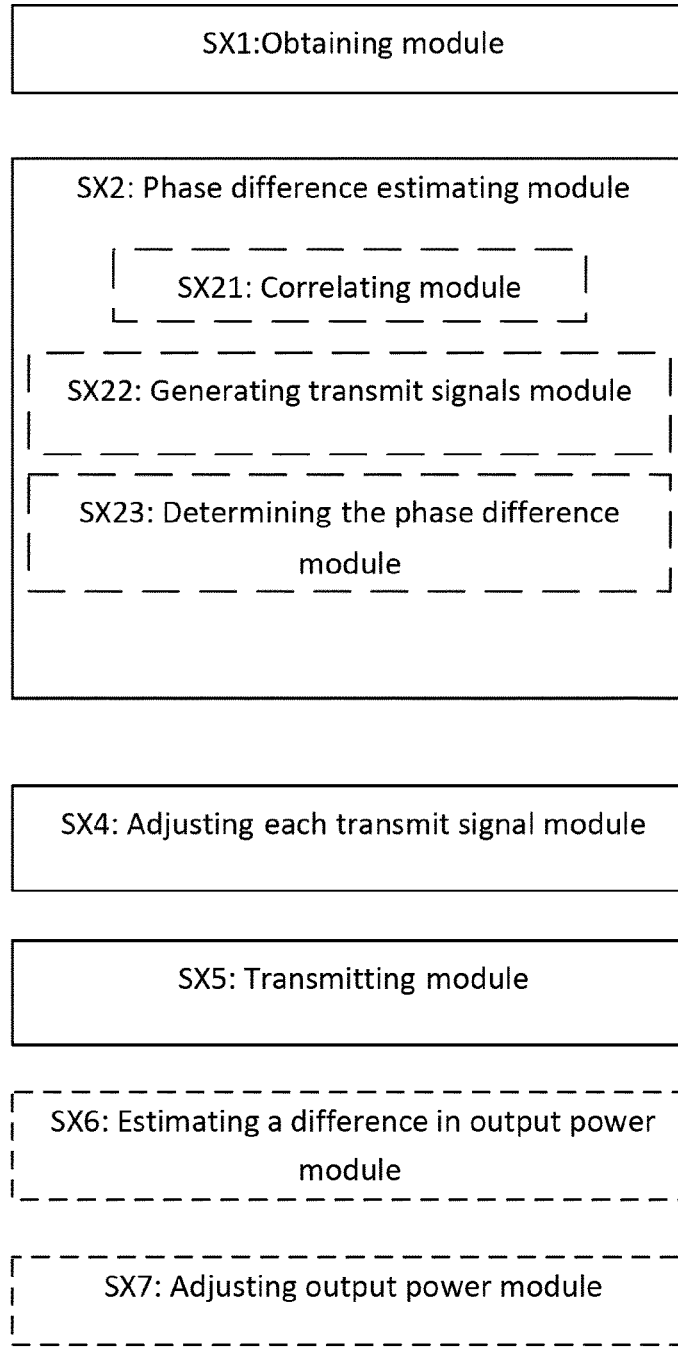
FIG. 4 is a block diagram illustrating a microwave radio transmitter according to some aspects of the present disclosure.

FIG. 4 shows a block diagram schematically illustrating aspects of a microwave radio transmitter apparatus configured to implement or realize at least some of the methods discussed herein. In particular, there is illustrated a microwave radio transmitter apparatus 400 configured to compensate for phase noise. The microwave radio transmitter 400 comprises an obtaining module SX1 configured to obtain an observation receive signal RX, the observation receive signal RX comprising signals $TX_i$ transmitted from N antenna elements of the microwave radio transmitter. The microwave radio transmitter 400 comprises a phase difference estimating module SX2 configured to estimate, for each antenna element $a_i$, a phase difference between the corresponding transmit signal $TX_i$ and the observation receive signal RX. According to some aspects, the phase difference estimating module SX2 comprises a correlating module SX21 configured to correlate the observation receive signal RX with each transmit signals $TX_i$ generated for each antenna element $a_i$. According to some aspects, the phase difference estimating module SX2 comprises a generating transmit signals module SX22 and a determining phase difference module SX23. The generating transmit signals module SX22 is configured to generate N−1 transmit signals having a zero amplitude and one transmit signal having a non-zero amplitude. The determining phase difference module SX23 is configured to determine the phase difference by comparing a phase of the transmit signal having the non-zero amplitude with the phase of the observation receive signal RX.

The microwave radio transmitter 400 comprises an adjusting transmit signal module SX5 configured to adjust each transmit signal based on the estimated phase difference. The microwave radio transmitter 400 comprises a transmitting signal module SX5 configured to transmit each phase-adjusted transmit signal.

According to some aspects, the microwave radio transmitter 400 comprises an estimating a difference in output power module SX6 configured to estimate a difference in output power module between two or more antenna elements $a_i$ 221 based on the observation receive signal RX, and an adjusting output power module SX7 configured to adjust output power of the antenna elements $a_i$ 221 based on the estimated difference.

It should be appreciated that FIG. 1-4 comprises some modules or operations which are illustrated with a darker border and some modules or operations which are illustrated with a dashed border. The modules or operations which are comprised in a darker border are modules or operations which are comprised in the broadest example embodiment. The modules or operations which are comprised in a dashed border are example embodiments which may be comprised in, or a part of, or are further modules or further operations which may be taken in addition to the modules or operations of the darker border example embodiments. It should be appreciated that operations need not be performed in order. Furthermore, it should be appreciated that not all of the operations need to be performed. The example operations may be performed in any order and in any combination.

It should be appreciated that the example operations of FIG. 3 may be performed simultaneously for any number of apparatuses.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products.

It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A microwave radio transmitter apparatus for compensation of phase noise, the microwave radio transmitter apparatus comprising:
an antenna arrangement; and
a processor connected to the antenna arrangement,
the processor being configured to receive a number N of signals $s_1, \ldots, s_N$ and to generate N phase-adjusted transmit signals $TX_1, \ldots, TX_N$;
the antenna arrangement comprising N antenna elements $a_i$, i=1, 2, . . . , N, each antenna element $a_i$ being configured to obtain a respective phase-adjusted transmit signal $TX_i$ from the processor and to transmit the respective phase-adjusted transmit signal $TX_i$;
wherein the processor is configured to obtain an observation receive signal RX, the observation receive signal comprising signals transmitted from the N antenna elements; and
wherein the processor is configured to estimate for each antenna element $a_i$ a phase difference between the corresponding transmit signal $TX_i$ and the observation receive signal RX, the phase difference varies over time;
wherein the processor is configured to estimate for each antenna element $a_i$ a frequency offset between the corresponding transmit signal $TX_i$ and the observation receive signal RX and
wherein the processor is configured to adjust each signal $s_i$ based on the estimated phase difference.

2. The microwave radio transmitter apparatus according to claim 1, wherein the processor is further configured to estimate the phase difference by correlating the observation receive signal RX with each transmit signal $TX_i$ generated for each antenna element $a_i$.

3. The microwave radio transmitter apparatus according to claim 1, wherein the processor is further configured to:
generate N−1 transmit signals having a zero amplitude and one transmit signal having a non-zero amplitude; and
determine the phase difference by comparing a phase of the transmit signal having the non-zero amplitude with the phase of the observation receive signal RX.

4. The microwave radio transmitter apparatus according to claim 1, wherein the N antenna elements are configured to transmit their respective transmit signals $TX_i$ at a same frequency.

5. The microwave radio transmitter apparatus according to claim 1, wherein the processor is configured to estimate a difference in output power between two or more antenna elements $a_i$ based on the observation receive signal RX, and adjust output power of the antenna elements $a_i$ based on the estimated difference.

6. The microwave radio transmitter apparatus according to claim 1, wherein the processor is configured to generate the transmit signal via phase compensation.

7. The microwave radio transmitter apparatus according to claim 1, wherein the antenna arrangement comprises N oscillators, each oscillator being associated with one respective antenna elements $a_i$.

8. The microwave radio transmitter apparatus according to claim 1, wherein the processor is configured to obtain the observation receive signal RX via a feedback channel, and wherein the feedback channel comprises a local feedback channel and/or a reverse feedback channel from a microwave radio receiver apparatus.

9. The microwave radio transmitter apparatus according to claim 8, wherein the feedback channel comprises a receive antenna.

10. The microwave radio transmitter apparatus according to claim 9, wherein the receive antenna is configured to be omnidirectional.

11. A radio system for microwave radio communications comprising:
a microwave radio transmitter apparatus comprising:
an antenna arrangement; and
a processor connected to the antenna arrangement,
the processor being configured to receive a number N of signals $s_1, \ldots, s_N$ and to generate N phase-adjusted transmit signals $TX_1, \ldots, TX_N$;
the antenna arrangement comprising N antenna elements $a_i$, i=1, 2, . . . , N, each antenna element $a_i$ being configured to obtain a respective phase-adjusted transmit signal $TX_i$ from the processor and to transmit the respective phase-adjusted transmit signal $TX_i$;
wherein the processor is configured to obtain an observation receive signal RX, the observation receive signal comprising signals transmitted from the N antenna elements; and wherein the processor is configured to estimate for each antenna element $a_i$ a phase difference between the corresponding transmit signal $TX_i$ and the observation receive signal RX, wherein the phase difference varies over time;

wherein the processor is configured to estimate for each antenna element $a_i$ a frequency offset between the corresponding transmit signal $TX_i$ and the observation receive signal RX; and wherein the processor is configured to adjust each signal $s_i$ based on the estimated phase difference; and one or more microwave radio receiver apparatuses, each microwave radio receiver apparatus comprising at least one antenna element;

wherein the microwave radio transmitter apparatus is configured to transmit transmit signals to the one or more microwave radio receiver apparatuses in a same frequency band.

12. The radio system according to claim 11, wherein the one or more microwave radio receiver apparatuses are configured to form a distributed antenna arrangement.

13. The radio system according to claim 11, wherein the microwave radio transmitter apparatus is configured to pre-code the transmit signals; and wherein the microwave radio receiver apparatus is configured to receive the transmitted signals and to process the received signals to recover data comprised in the transmit signals.

14. A method for compensating for phase noise, the method being performed in a microwave radio transmitter apparatus, the method comprising:

obtaining an observation receive signal RX, the observation receive signal RX comprising N phase-adjusted transmit signal $TX_i$ signals transmitted from an antenna arrangement comprising N antenna elements $a_i$, i=1, 2, ..., N, each antenna element $a_i$ being configured to transmit a respective transmit signal $TX_i$;

estimating, for each antenna element $a_i$, a phase difference between the corresponding transmit signal $TX_i$ and the observation receive signal RX, the phase difference varies over time;

estimating for each antenna element $a_i$ a frequency offset between the corresponding transmit signal $TX_i$ and the observation receive signal RX;

adjusting each transmit signal based on the estimated phase difference, and transmitting each phase-adjusted transmit signal.

15. The method according to claim 14, wherein estimating a phase difference comprises correlating the observation receive signal RX with each transmit signals $TX_i$ generated for each antenna element $a_i$.

16. The method according to claim 14, wherein the estimating a phase difference comprises:

generating N−1 transmit signals having a zero amplitude and one transmit signal having a non-zero amplitude; and determining the phase difference by comparing a phase of the transmit signal having the non-zero amplitude with the phase of the observation receive signal RX.

17. The method according to claim 14, further comprising:

estimating a difference in output power between two or more antenna elements $a_i$ based on the observation receive signal RX, and adjusting output power of the antenna elements $a_i$ based on the estimated difference.

* * * * *

UNITED STATES PATENT AND TRADEMARK OFFICE
CERTIFICATE OF CORRECTION

PATENT NO.        : 9,654,153 B2
APPLICATION NO.   : 14/786413
DATED             : May 16, 2017
INVENTOR(S)       : Gerdin It is certified that error appears in the above-identified patent and that said Letters Patent is hereby corrected as shown below:

On the Title Page

In Item (56), under "U.S. PATENT DOCUMENTS", in Column 2, Line 1, delete "Codreanu" and insert -- Codreanu et al. --, therefor.

In Item (56), under "U.S. PATENT DOCUMENTS", in Column 2, Line 3, delete "Tirkkonen" and insert -- Tirkkonen et al. --, therefor.

On Page 2, in Item (56), under "U.S. PATENT DOCUMENTS", in Column 1, Line 3, delete "Aharony" and insert -- Aharony et al. --, therefor.

On Page 2, in Item (56), under "U.S. PATENT DOCUMENTS", in Column 1, Line 5, delete "Lorenz" and insert -- Lorenz et al. --, therefor.

In the Specification

In Column 3, Line 58, delete "logic" and insert -- gate --, therefor.

In Column 7, Line 66, delete "determinor" and insert -- determiner --, therefor.

In Column 8, Line 52, delete "transmitter 220" and insert -- transmitter 200 --, therefor.

In Column 9, Line 26, delete "antenna 255" and insert -- antenna 225 --, therefor.

In Column 11, Line 55, delete "module SX5" and insert -- module SX4 --, therefor.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,654,153 B2

In the Claims

In Column 13, Line 50, in Claim 1, delete "arrangement," and insert -- arrangement; --, therefor.

In Column 13, Line 62, in Claim 1, delete "elements; and" and insert -- elements; --, therefor.

In Column 14, Line 4, in Claim 1, delete "RX and" and insert -- RX; and --, therefor.

In Column 14, Line 50, in Claim 11, delete "communications" and insert -- communications, --, therefor.

In Column 14, Line 54, in Claim 11, delete "arrangement," and insert -- arrangement; --, therefor.

In Column 14, Line 67, in Claim 11, delete "elements; and" and insert -- elements; --, therefor.

In Column 16, Line 12, in Claim 14, delete "difference, and" and insert -- difference; and --, therefor.